United States Patent

(12) United States Patent
Chiu

(10) Patent No.: US 7,922,259 B2
(45) Date of Patent: Apr. 12, 2011

(54) VEHICULAR WHEEL WITH REPLACEABLE PROTECTIVE RING

(76) Inventor: Hsin-Ming Chiu, Bade (TW)

( * ) Notice: Subject to any disclaimer, the term of this patent is extended or adjusted under 35 U.S.C. 154(b) by 102 days.

(21) Appl. No.: 12/539,001

(22) Filed: Aug. 11, 2009

(65) Prior Publication Data

US 2011/0037309 A1    Feb. 17, 2011

(51) Int. Cl.
    *B60B 7/01*    (2006.01)
(52) U.S. Cl. .................. 301/37.24; 301/37.371
(58) Field of Classification Search ............ 301/37.101, 301/37.102, 37.371, 37.11, 37.43, 37.24
    See application file for complete search history.

(56) References Cited

U.S. PATENT DOCUMENTS

| 1,993,813 | A | * | 3/1935 | Rosa et al. | 301/37.24 |
| 2,048,442 | A | * | 7/1936 | Frank | 301/6.2 |
| 2,380,649 | A | * | 7/1945 | Hollerith | 152/406 |
| 4,818,030 | A | * | 4/1989 | Yoshida | 301/5.24 |
| 6,916,072 | B2 | | 7/2005 | Bernoni | 301/37.24 |
| 2007/0120415 | A1 | * | 5/2007 | Kang | 301/37.24 |

FOREIGN PATENT DOCUMENTS

| EP | 1792748 | 6/2007 |
| GB | 2412635 | 10/2005 |
| WO | WO 0024595 | 5/2000 |
| WO | WO 02100659 | 12/2002 |

* cited by examiner

*Primary Examiner* — Russell D Stormer
(74) *Attorney, Agent, or Firm* — Alan Kamrath; Kamrath & Associates PA

(57) ABSTRACT

A vehicular wheel includes a wheel having a rim with first and second flanges respectively extending radially outward from first and second ends of the rim. The first flange includes inner and outer faces and an interconnecting face extending between the inner and outer faces. An annular groove extends from the outer face towards but spaced from the inner face and is in communication with a plurality of fixing holes formed in the interconnecting face. A protective ring includes an annular body covering an inner surface of the first end of the rim and the outer face of the first flange. An annular extension extends from an end of the annular body and is received in the annular groove. The annular extension includes a plurality of positioning holes aligned with the fixing holes, respectively. A fastener extends through each fixing hole and one of the positioning holes.

5 Claims, 9 Drawing Sheets

VEHICULAR WHEEL WITH REPLACEABLE PROTECTIVE RING

BACKGROUND OF THE INVENTION

The present invention relates to a wheel and, more particularly, to a vehicular wheel with a replaceable protective ring.

A wheel made from aluminum alloy generally includes a hub, a rim, and a plurality of spokes interconnected between the hub and the rim. Two flanges respectively extend radially outward from two ends of the rim to allow mounting of a rubber tire around the rim. The shiny appearance of the wheel made from aluminum alloy gradually deteriorates, particularly at the surfaces of the flanges and the inner periphery of the rim. To protect the wheel, a protective ring made from stainless steel is engaged or bonded to the wheel without the risk of disengagement of the protective ring. However, damage and scratch of the protective ring are inevitable during use of the wheel. Replacement of the protective ring without discarding the wheel is impossible, resulting in an increase in the maintenance costs and waste of resources.

Thus, a need exists for a vehicular wheel with a replaceable protective ring to save maintenance costs and to avoid waste of resources.

BRIEF SUMMARY OF THE INVENTION

The present invention solves this need and other problems in the field of replaceable protective rings for wheels by providing, in a preferred aspect, a vehicular wheel including a metal wheel having a rim and a hub interconnected to an inner periphery of the rim. The rim includes an annular wall having first and second ends spaced along an axis. Each of the first and second ends of the rim includes an inner surface. A first flange extends outward from the first end in a radial direction perpendicular to the axis. A second flange extends outward from the second end in the radial direction perpendicular to the axis. The first and second flanges are spaced along the axis. The first flange includes inner and outer faces spaced along the axis. The first flange further includes an interconnecting face extending between the inner and outer faces of the first flange. The outer face of the first flange adjoins the inner surface of the first end of the rim, and the second flange includes an outer face adjoining the inner surface of the second end of the rim. The first flange includes an annular groove extending from the outer face of the first flange towards but spaced from the inner face of the first flange. A plurality of fixing holes is formed in the interconnecting face of the first flange and in communication with the annular groove. A metal protective ring includes an annular body covering the inner surface of the first end of the rim and the outer face of the first flange. An annular extension extends from an end of the annular body along the axis. The annular extension is received in the annular groove. The annular extension includes a plurality of positioning holes aligned with the fixing holes, respectively. A fastener extends through each fixing hole and one of the positioning holes.

In a form shown, the protective ring includes an annular bend extending in the radial direction and interconnected between the annular body and the annular extension. The annular groove separate each fixing hole into an inner section and an outer section spaced from the inner section in the radial direction. A bushing is received in the inner section of each fixing hole and has a screw hole. Each fastener includes a first section having a diameter larger than the positioning holes and a second, threaded section having a diameter smaller than the first section. The first section of each fastener abuts the annular extension. The second, threaded section of each fastener extends through one of the positioning holes and into the screw hole of one of the bushings.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where.

All figures are drawn for ease of explanation of the basic teachings of the present invention only; the extensions of the figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

DETAILED DESCRIPTION OF THE INVENTION

Figure 1:
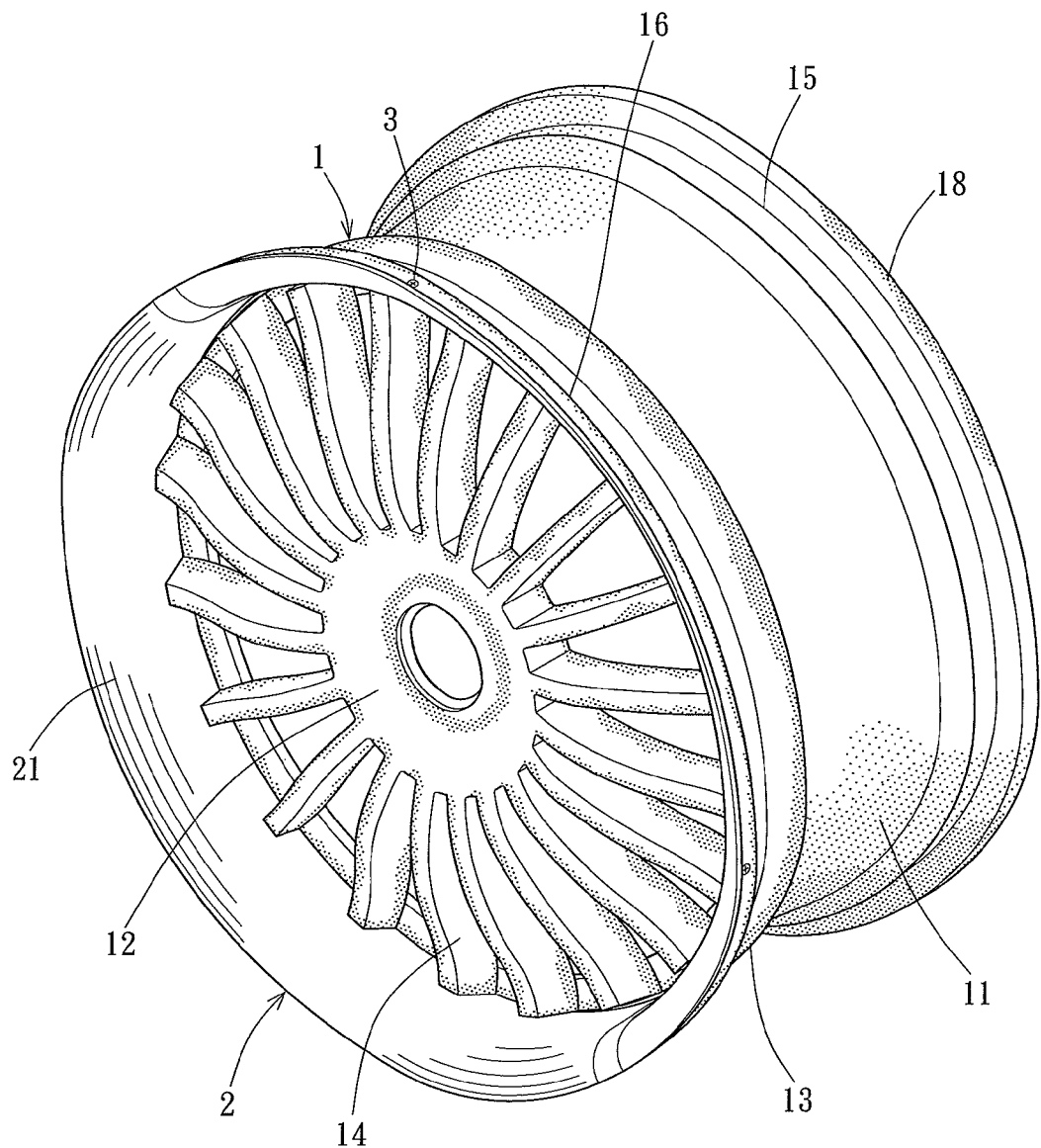
FIG. 1 shows a perspective view of a vehicular wheel according to the preferred teachings of the present invention.
Figure 2:
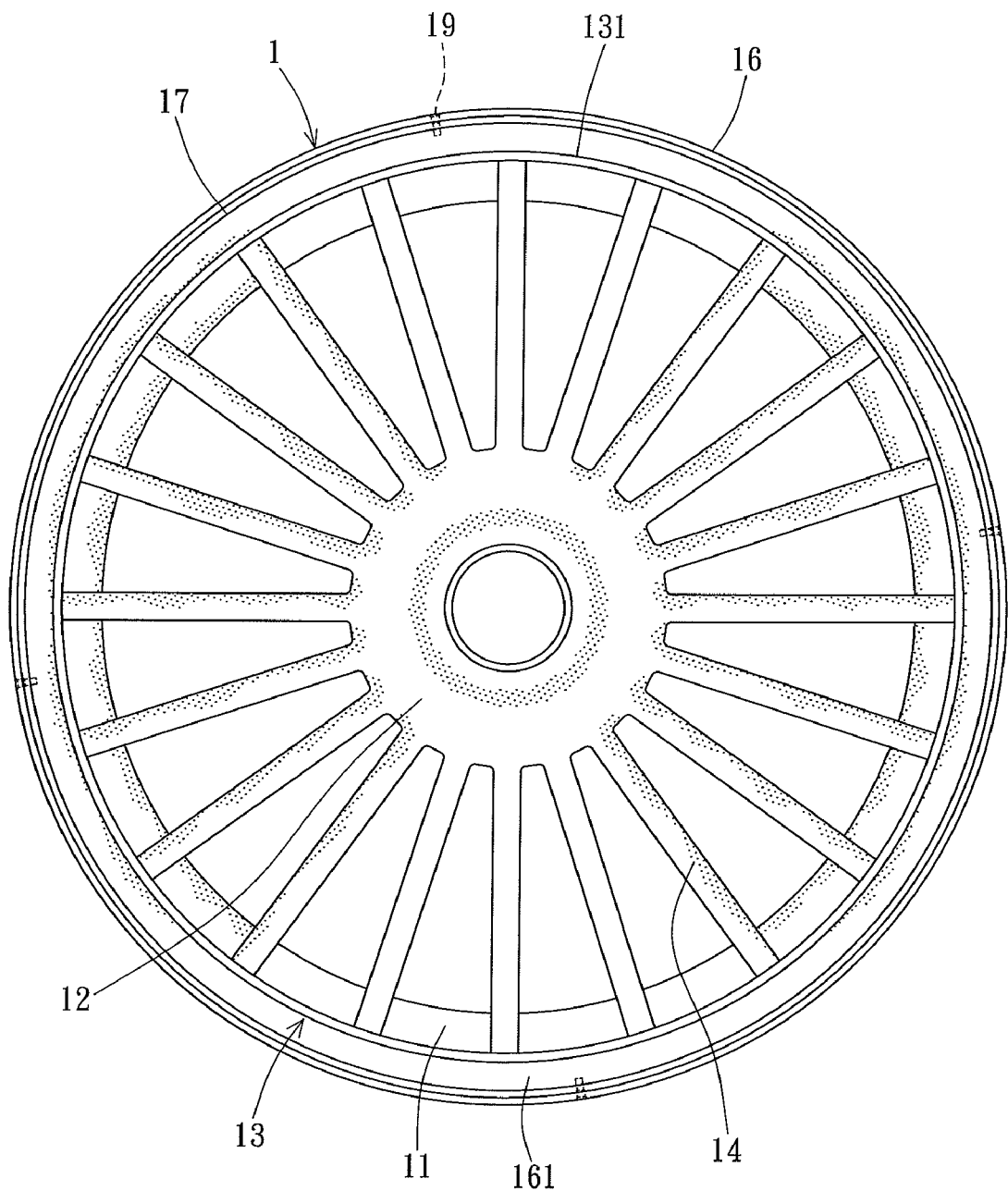
FIG. 2 shows a side view of the vehicular wheel of FIG. 1 with a protective ring removed.
Figure 3:
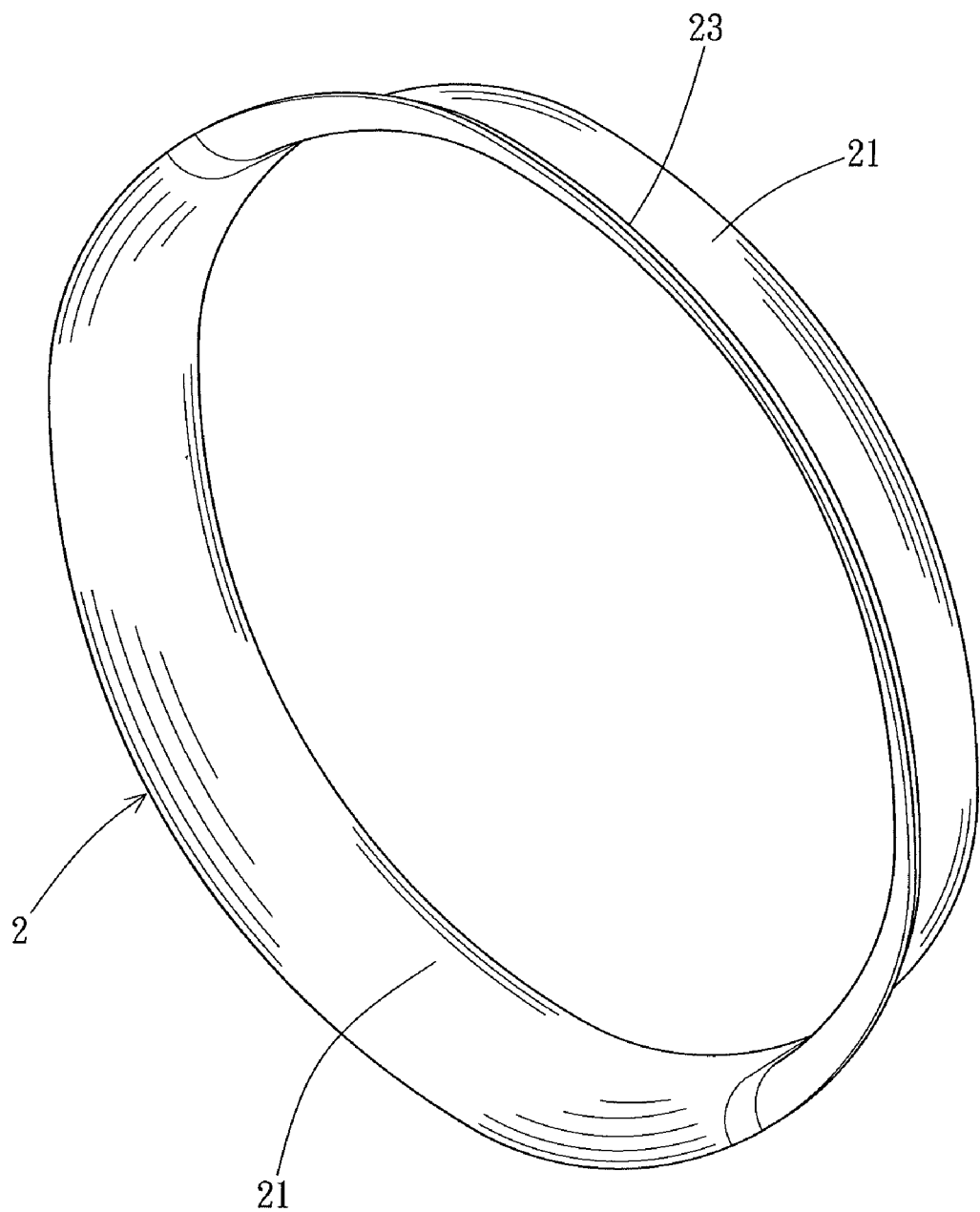
FIG. 3 shows a perspective view of the protective ring of the vehicular wheel of FIG. 1.
Figure 4:
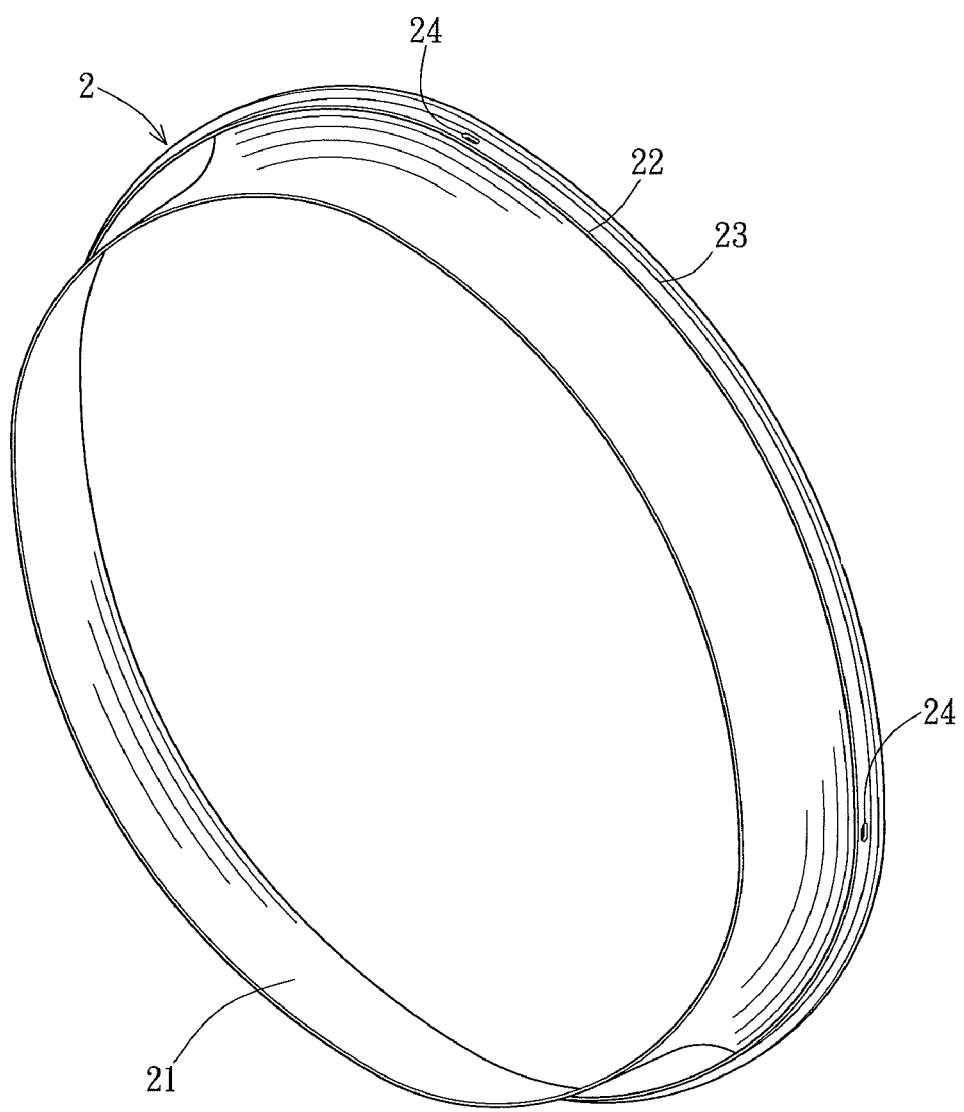
FIG. 4 shows another perspective view of the protective ring of FIG. 3.
Figure 5:
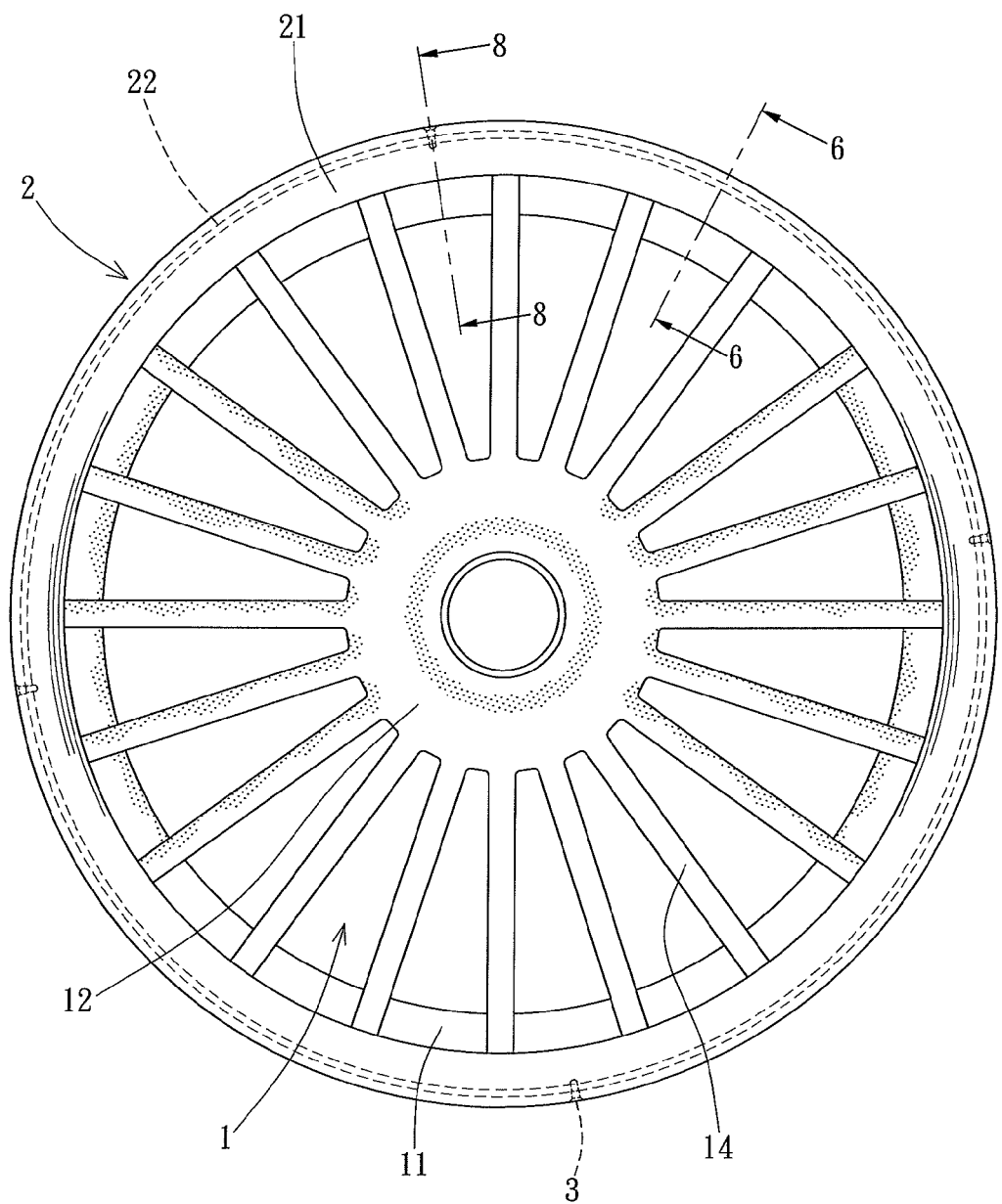
FIG. 5 shows a side view of the vehicular wheel of FIG. 1.
Figure 6:
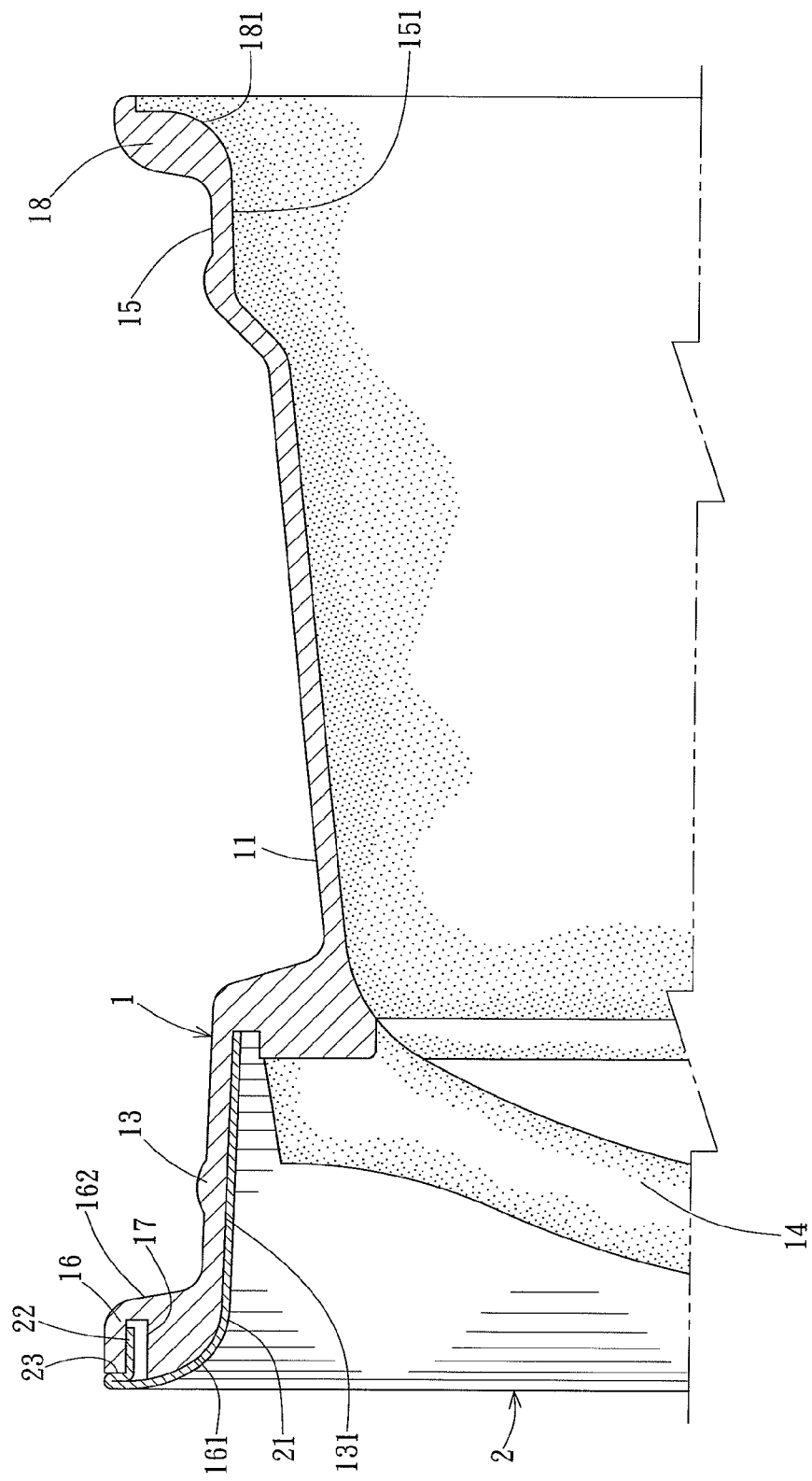
FIG. 6 shows a cross sectional view of the vehicular wheel of FIG. 1 according to section line 6-6 of FIG. 5.
Figure 8:
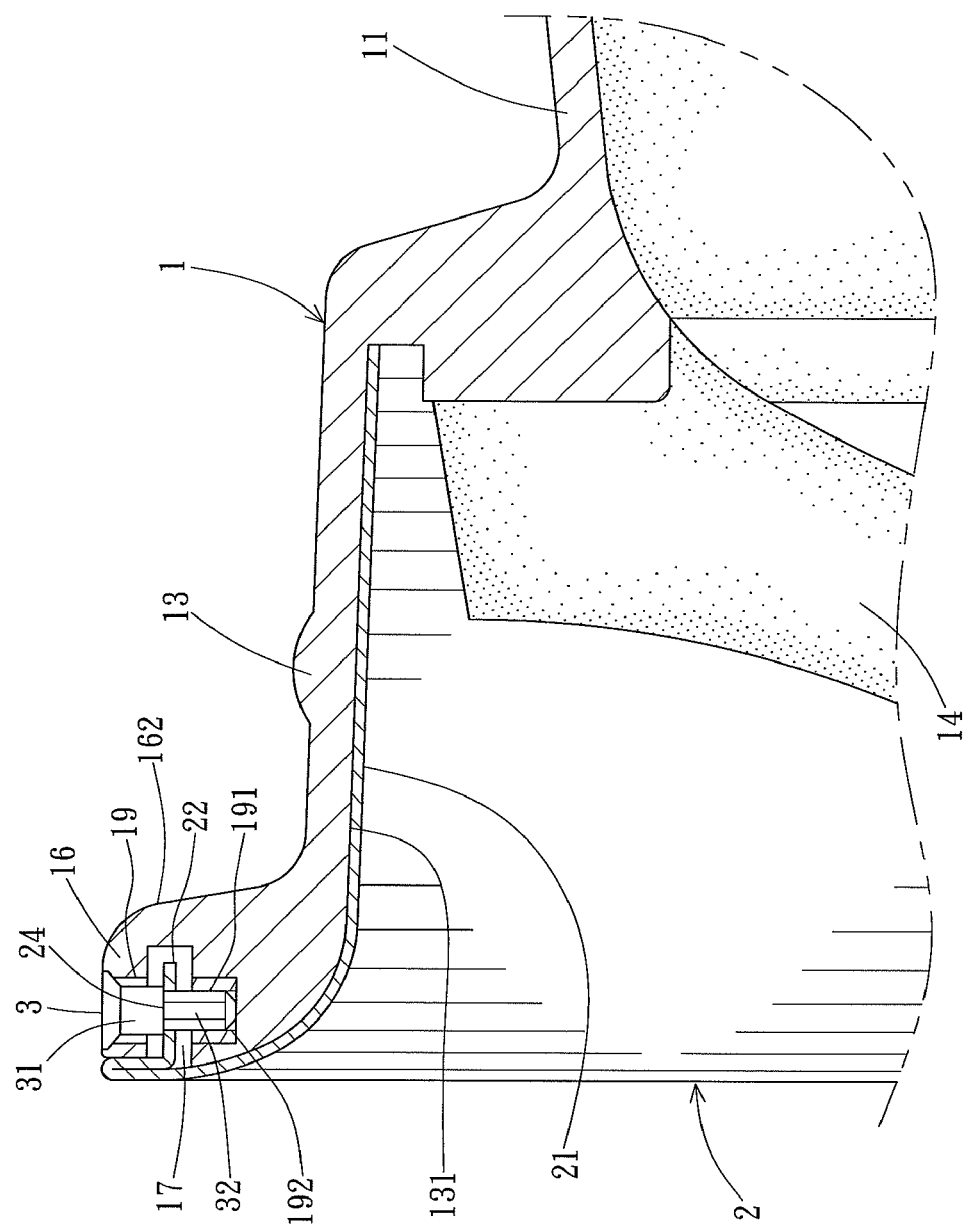
FIG. 8 shows a cross sectional view of the vehicular wheel of FIG. 1 according to section line 8-8 of FIG. 5.
Figure 9:
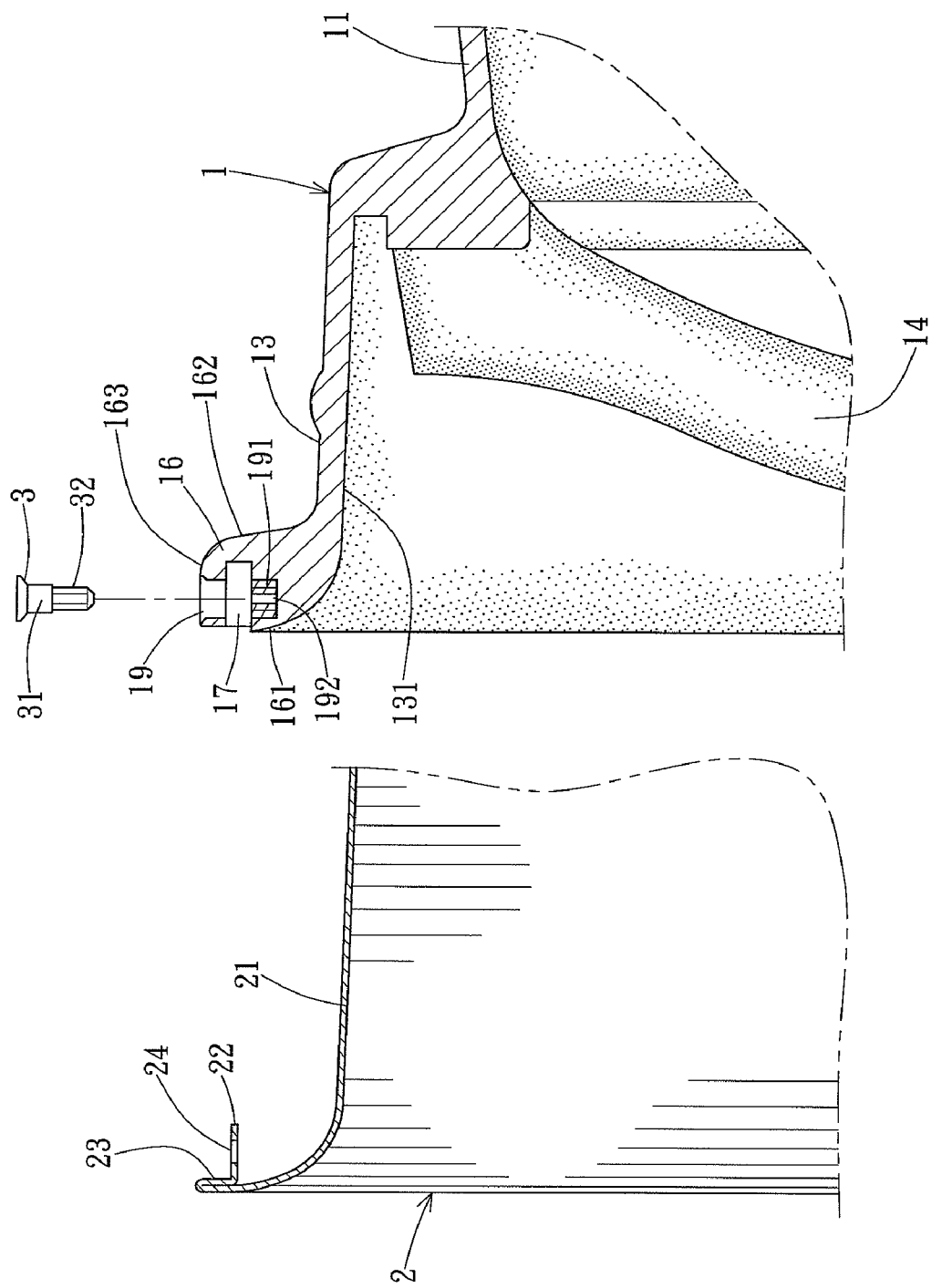
FIG. 9 shows a partial, exploded, cross sectional view of the vehicular wheel of FIG. 1.

A vehicular wheel of an embodiment according to the preferred teachings of the present invention is shown in FIGS. 1-6, 8 and 9 of the drawings and generally includes a metal wheel 1 and a metal protective ring 2 preferably made from stainless steel. The protective ring 2 is on an outer side of a vehicle to which the vehicular wheel is mounted, presenting the bright appearance and quality of stainless steel while protecting an inner side of the wheel 1.

Figure 7:
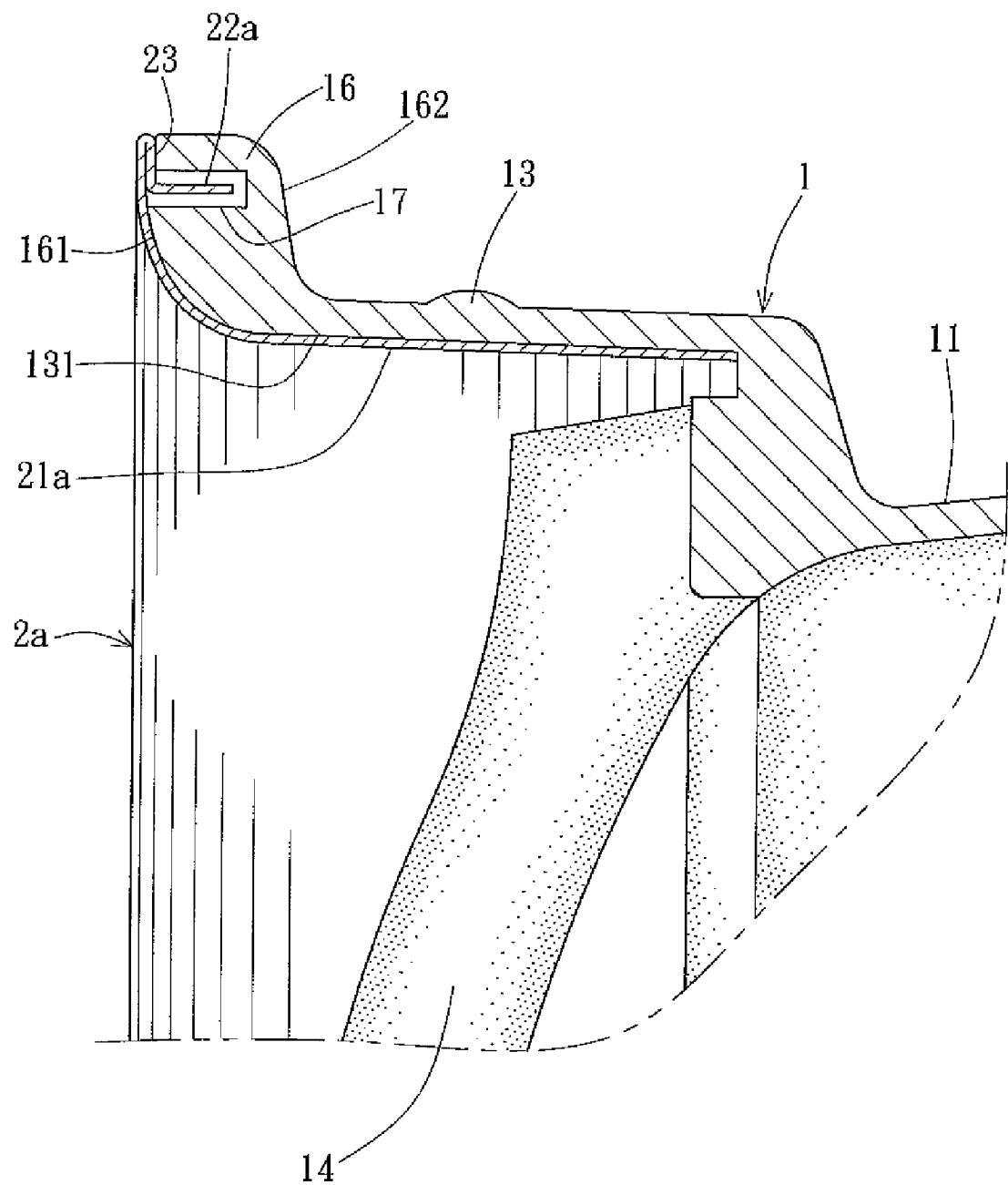
FIG. 7 is a partial, cross sectional view similar to FIG. 6, illustrating another arrangement of coupling of the protective ring and the wheel of the vehicular wheel according to the preferred teachings of the present invention.

According to the forms shown in FIGS. 1-9, the wheel 1 includes a hub 12, a rim 11, and a plurality of radially extending spokes 14 each interconnected between the hub 12 and an inner periphery of the rim 11. The rim 11 includes an annular wall having first and second ends 13 and 15 spaced along an axis. Each of the first and second ends 13 and 15 of the rim 11 includes an inner surface 131, 151. A first flange 16 extends outward from the first end 13 in a radial direction perpendicular to the axis. A second flange 18 extends outward from the second end 15 in the radial direction perpendicular to the axis. The first and second flanges 16 and 18 are spaced along the axis. The first flange 16 includes inner and outer faces 161 and 162 spaced along the axis. The first flange 16 further includes an interconnecting face 163 (FIG. 9) extending between the inner and outer faces 161 and 162 of the first flange 16. The outer face 161 of the first flange 16 adjoins the inner surface 131 of the first end 13 of the rim 11. The second flange 18 includes an outer face 181 adjoining the inner surface 151 of the second end 15 of the rim 11. The first flange 16 includes an annular groove 17 extending from the outer face 161 of the first flange 16 towards but spaced from the inner face 162 of the first flange 16. A plurality of fixing holes 19 is formed in the interconnecting face 163 of the first flange 16 and in communication with the annular groove 17. The annular groove 17 separates each fixing hole 19 into an inner section and an outer section spaced from the inner section in the radial direction. A bushing 191 is received in the inner section of each fixing hole 19 and has a screw hole 192. However, the screw hole 192 can be directly formed in the first flange 16 without utilizing the bushings 191. The inner face 162 of the first flange 16 is free of annular groove and holes, assuring air tightness after a rubber tire is mounted to the vehicular wheel.

According to the form shown in FIGS. 1-6, 8, and 9, the protective ring 2 includes an annular body 21 covering the inner surface 131 of the first end 13 of the rim 11 and the outer face 161 of the first flange 16. An annular extension 22 extends from an end of the annular body 21 along the axis. The annular extension 22 is removably received in the annular groove 17. The annular extension 22 includes a plurality of positioning holes 24 respectively aligned with the fixing holes 19 when the annular extension 22 is received in the annular groove 17. The protective ring 2 includes an annular bend 23 extending in the radial direction and interconnected between the annular body 21 and the annular extension 22 to reinforce the structure while allowing easy manufacture. The annular extension 22 abuts an outer wall of the annular groove 17. According to the form shown in FIG. 7, the annular extension 22a extends from an end of the annular body 21a of the protective ring 2a and is spaced from the outer wall and an inner wall of the annular groove 17.

According to the forms shown in FIGS. 1-9, a fastener 3 is extended through each fixing hole 19 of the first flange 16 and one of the positioning holes 24 of the protective ring 2. Each fastener 3 includes a first section 31 having a diameter larger than the positioning holes 24 and a second, threaded section 32 having a diameter smaller than the first section 31. The first section 31 of each fastener 3 abuts the annular extension 22. The second, threaded section 32 of each fastener 3 extends through one of the positioning holes 24 and into the screw hole 192 of one of the bushings 191. Each positioning hole 24 can be an elongate hole to allow adjustment of the position of the positioning hole 24 along the axis to align with one of the fixing holes 19.

The protective ring 2 can be rapidly fixed to the first flange 16 of the wheel 1 by the fasteners 3 to present the bright appearance while protecting the wheel 1. Furthermore, the protective ring 2, when damaged and/or scratched to an extent, can be rapidly removed from the wheel 1 after removing the fasteners 3 from the first flange 16 and then replaced with a new one without discarding the whole vehicular wheel, saving maintenance costs and avoiding waste of resources.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A vehicular wheel comprising:
a metal wheel including a rim and a hub interconnected to an inner periphery of the rim, with the rim including an annular wall having first and second ends spaced along an axis, with each of the first and second ends of the rim including an inner surface, with a first flange extending outward from the first end in a radial direction perpendicular to the axis, with a second flange extending outward from the second end in the radial direction perpendicular to the axis, with the first and second flanges spaced along the axis, with the first flange including inner and outer faces spaced along the axis, with the first flange further including an interconnecting face extending between the inner and outer faces of the first flange, with the outer face of the first flange adjoining the inner surface of the first end of the rim, with the second flange including an outer face adjoining the inner surface of the second end of the rim, with the first flange including an annular groove extending from the outer face of the first flange towards but spaced from the inner face of the first flange, with a plurality of fixing holes formed in the interconnecting face of the first flange and in communication with the annular groove;
a metal protective ring including an annular body covering the inner surface of the first end of the rim and the outer face of the first flange, with an annular extension extending from an end of the annular body along the axis, with the annular extension received in the annular groove, with the annular extension including a plurality of positioning holes aligned with the plurality of fixing holes, respectively; and
a plurality of fasteners each extending through one of the plurality of the fixing holes and one of the positioning holes.

2. The vehicular wheel as claimed in claim 1, with the protective ring further including an annular bend extending in the radial direction and interconnected between the annular body and the annular extension.

3. The vehicular wheel as claimed in claim 1, with the annular groove separating each of the plurality of fixing holes into an inner section and an outer section spaced from the inner section in the radial direction, with the inner section of each of the plurality of fixing holes being a screw hole, with each of the plurality of the fasteners engaged in the screw hole of one of the plurality of fixing holes.

4. The vehicular wheel as claimed in claim 3, with each of the plurality of fasteners including a first section having a diameter larger than the positioning holes and a second, threaded section having a diameter smaller than the first section, with the first section of each of the plurality of fasteners abutting the annular extension, and with the second, threaded section of each of the plurality of fasteners extending through one of the plurality of positioning holes and into the screw hole of one of the plurality of fixing holes.

5. The vehicular wheel as claimed in claim 1, with the annular groove separating each of the plurality of fixing holes into an inner section and an outer section spaced from the inner section in the radial direction, with the vehicular wheel further comprising: a plurality of bushings each received in the inner section of one of the plurality of fixing holes and each having a screw hole, with each of the plurality of fasteners including a first section having a diameter larger than the positioning holes and a second, threaded section having a diameter smaller than the first section, with the first section of each of the plurality of fasteners abutting the annular extension, and with the second, threaded section of each of the plurality of fasteners extending through one of the plurality of positioning holes and into the screw hole of one of the plurality of bushings.

* * * * *